US008593611B2

(12) United States Patent
Cheng et al.

(10) Patent No.: US 8,593,611 B2
(45) Date of Patent: Nov. 26, 2013

(54) LIQUID CRYSTAL DISPLAY PANEL HAVING CONDUCTIVE SEALENT

(75) Inventors: Chia-Yang Cheng, Hsinchu (TW); Shih-Hsun Lo, Hsinchu County (TW); Shan-Fu Yuan, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 189 days.

(21) Appl. No.: 13/218,474

(22) Filed: Aug. 26, 2011

(65) Prior Publication Data

US 2012/0327355 A1 Dec. 27, 2012

(30) Foreign Application Priority Data

Jun. 24, 2011 (TW) .............................. 100122281 A

(51) Int. Cl.
*G02F 1/1345* (2006.01)
*G02F 1/1339* (2006.01)
(52) U.S. Cl.
USPC ........... 349/149; 349/152; 349/153; 349/155; 349/156
(58) Field of Classification Search
USPC .................... 349/149, 152, 153, 155, 156
See application file for complete search history.

(56) References Cited

U.S. PATENT DOCUMENTS

| | | | | |
|---|---|---|---|---|
| 2003/0025868 A1* | 2/2003 | Hiroshima et al. | ........... | 349/156 |
| 2004/0066480 A1* | 4/2004 | Yoshida et al. | ............... | 349/123 |
| 2007/0153211 A1* | 7/2007 | Whitehead Jr. et al. | ...... | 349/153 |
| 2009/0244422 A1 | 10/2009 | Okazaki et al. | | |
| 2010/0181902 A1* | 7/2010 | Kita | ............... | 313/504 |
| 2012/0019763 A1* | 1/2012 | Kang et al. | .................... | 349/153 |

FOREIGN PATENT DOCUMENTS

CN 101706619 5/2010

OTHER PUBLICATIONS

"First Office Action of China Counterpart Application", issued on Oct. 22, 2012, p. 1-p. 4, in which the listed reference was cited.

* cited by examiner

*Primary Examiner* — Michael Caley
(74) *Attorney, Agent, or Firm* — Jianq Chyun IP Office

(57) ABSTRACT

A LCD panel including an active device array substrate, an opposite substrate, a liquid crystal layer, a conductive sealant and restraining elements is provided. The active device array substrate includes common lines, transfer pads and a dielectric layer. The dielectric layer has openings exposing the transfer pads. The opposite substrate has a common electrode. The liquid crystal layer and the conductive sealant are disposed between the active device array substrate and the opposite substrate. The conductive sealant surrounds the liquid crystal layer. The openings are corresponding to corners of the conductive sealant. The conductive sealant fills the openings and the common electrode is electrically connected to the transfer pads through the conductive sealant. Further, the restraining elements are between the active device array substrate and the opposite substrate and are distributed around the corners of the conductive sealant such that the conductive sealant is forced to fill into the openings.

6 Claims, 3 Drawing Sheets

LIQUID CRYSTAL DISPLAY PANEL HAVING CONDUCTIVE SEALENT

CROSS-REFERENCE TO RELATED APPLICATION

This application claims the priority benefit of Taiwan application serial no. 100122281, filed on Jun. 24, 2011. The entirety of the above-mentioned patent application is hereby incorporated by reference herein and made a part of this specification.

BACKGROUND OF THE INVENTION

1. Field of the Invention

The invention is related to a display panel, and in particular to a liquid crystal display (LCD) panel.

2. Description of Related Art

Nowadays, the performance requirements of the market for the LCDs are high contrast ratio, no gray scale inversion, little color shift, high luminance, high color vividness, high color saturation, quick response, wide-viewing angle and so forth.

In the conventional thin film transistor liquid crystal displays (TFT-LCDs), an organic passivation and pixel electrodes electrically connected to thin film transistors are formed on an inorganic passivation that covers the thin film transistors so as to increase aperture ratio. Since the thickness of the organic passivation is about 40000 angstroms, the pixel electrodes formed on the organic passivation can extend above and overlap with scan lines and data lines. In the pixel design with high aperture ratio, since the thickness of the organic passivation is great (about 40000 angstroms), parasitic capacitance between the pixel electrodes and the scan lines and parasitic capacitance between the pixel electrodes and the data lines can be ignored.

In the conventional TFT-LCDs, a plurality of openings are required to be formed in the organic passivation to electrically connect transfer pads of a TFT array substrate and a common electrode of a color filter substrate. Further, silver paste is required to be dispensed at positions corresponding to the transfer pads. Since sealant and the aforesaid silver paste are formed by different dispensing processes, the dispensing of silver paste lowers throughput of the conventional TFT-LCDs. In addition, due to the dispensing of silver paste, the cell gaps of the conventional TFT-LCDs cannot be precisely controlled thereby display mura generates.

SUMMARY OF THE INVENTION

The present invention provides a liquid crystal display (LCD) panel having a conductive sealant and restraining elements.

The invention provides an LCD panel including an active device array substrate, an opposite substrate, a liquid crystal layer, a conductive sealant and a plurality of restraining elements. The active device array substrate includes a plurality of common lines, a plurality of transfer pads and a dielectric layer. The transfer pads are electrically connected to the common lines. The dielectric layer has a plurality of openings exposing the transfer pads. The opposite substrate has a common electrode and the liquid crystal layer is disposed between the active device array substrate and the opposite substrate. The conductive sealant is disposed between the active device array substrate and the opposite substrate and surrounds the liquid crystal layer. The openings are corresponding to corners of the conductive sealant. The conductive sealant fills the openings and the common electrode is electrically connected to the transfer pads through the conductive sealant. Further, the restraining elements are disposed between the active device array substrate and the opposite substrate and are distributed around the corners of the conductive sealant such that the conductive sealant is forced to fill into the openings.

In an embodiment of the present invention, the thickness of the dielectric layer ranges from about 42000 angstroms to about 43000 angstroms.

In an embodiment of the present invention, the restraining elements are in contact with the dielectric layer and the opposite substrate to support between the dielectric layer and the opposite substrate.

In an embodiment of the present invention, the restraining elements are in contact with the corners of the conductive sealant to limit a width of the corners of the conductive sealant.

In an embodiment of the present invention, each of the restraining elements is an L-shaped restraining element or an arc-shaped restraining element.

In an embodiment of the present invention, the restraining elements includes a plurality of inner restraining elements and a plurality of outer restraining elements, wherein the inner restraining elements are distributed in an area surrounded by the conductive sealant, and the outer restraining elements are distributed outside the area surrounded by the conductive sealant.

In an embodiment of the present invention, each of the inner restraining elements is an L-shaped inner restraining element or an arc-shaped inner restraining element. Each of the outer restraining elements is an L-shaped outer restraining element or an arc-shaped outer restraining element.

In an embodiment of the present invention, each of the inner restraining elements includes a first deflection portion and two first extending portions connected to two ends of the first deflection portion, each of the outer restraining elements includes a second deflection portion and two second extending portions connected to two ends of the second deflection portion. The conductive sealant located between the first deflection portion and the second deflection portion has a first width, the conductive sealant located between the first extending portion and the second extending portion has a second width. The second width is greater than the first width.

Since conductive sealant and restraining elements are used in the LCD panel of the present application, and the restraining elements are disposed around each corner of the conductive sealant, the conductive sealant can be forced to fill into the openings of the dielectric layer during the bonding process of the TFT array substrate and the color filter substrate. Accordingly, the common lines of the TFT array substrate are electrically connected to the common electrode of the color filter substrate more reliably.

To make the above and other objectives, features, and advantages of the invention more comprehensible, several embodiments accompanied with figures are detailed as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
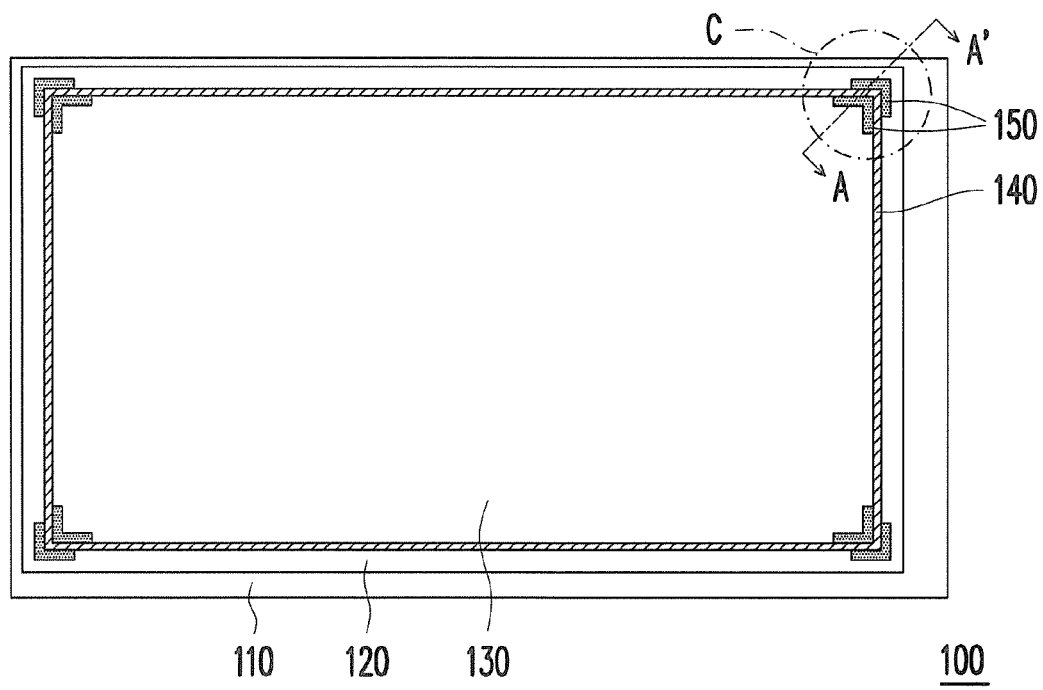
FIG. 1 is a schematic top view illustrating an LCD panel according to an embodiment of the application.
Figure 2:
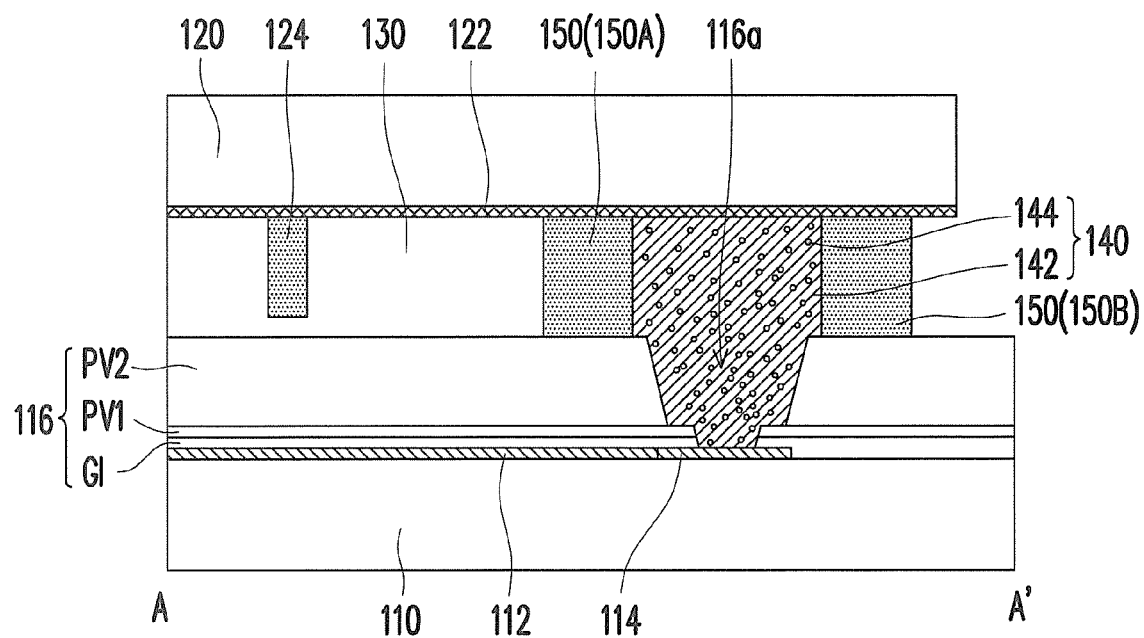
FIG. 2 is a schematic cross-sectional view taken along a cross-section A-A' depicted in FIG. 1.

FIG. 1 is a schematic top view illustrating an LCD panel according to an embodiment of the application. FIG. 2 is a schematic cross-sectional view taken along a cross-section A-A' depicted in FIG. 1. With reference to FIG. 1 and FIG. 2, an LCD panel 100 of this embodiment includes an active device array substrate 110, an opposite substrate 120, a liquid crystal layer 130, a conductive sealant 140, and a plurality of restraining elements. The active device array substrate 110 includes a plurality of common lines 112, a plurality of transfer pads 114 and a dielectric layer 116. The transfer pads 114 are electrically connected to the common lines 112. The dielectric layer 116 has a plurality of openings 116a exposing the transfer pads 114. The opposite substrate 120 has a common electrode 122. The liquid crystal layer 130 is disposed between the active device array substrate 110 and the opposite substrate 120. The conductive sealant 140 is disposed between the active device array substrate 110 and the opposite substrate 120. The conductive sealant 140 surrounds the liquid crystal layer 130. The openings 116a of the dielectric layer 116 are corresponding to a plurality of corners C of the conductive sealant 140. The conductive sealant 140 fills the openings 116a such that the common electrode 122 is electrically connected to the transfer pads 114 through the conductive sealant 140 successfully. Further, the restraining elements 150 are disposed between the active device array substrate 110 and the opposite substrate 120. The restraining elements 150 are distributed around the corners C of the conductive sealant 140 such that the conductive sealant 140 is forced to fill into the openings 116a of the dielectric layer 116. The restraining elements 150 are in contact with the conductive sealant 140, for example.

In this embodiment, the active device array substrate 110 is a thin film transistor array substrate, for example. In addition to the common lines 112, the transfer pads 114 and the dielectric layer 116, the active device array substrate 110 further includes a plurality of scan lines, a plurality of data lines and a plurality of pixel units arranged in array. The pixel units are electrically connected to the scan lines and the data lines. Further, the dielectric layer 116 covers the scan lines, the data lines, the pixel units, the common lines 112 and the transfer pads 114.

For high aperture ratio, the thickness of the dielectric layer 116 on the active device array substrate 110 ranges from about 42000 angstroms to about 43000 angstroms, for example. In this embodiment, the dielectric layer 116 is a stacked structure formed by an organic dielectric material layer PV2, an inorganic dielectric material layer PV1 and a gate insulator GI, wherein the thickness of the organic dielectric material layer PV2 is about 40000 angstroms, the thickness of the inorganic dielectric material layer PV1 is about 2000 angstroms to about 3000 angstroms, and the thickness of the gate insulator GI is about 1000 angstroms to about 2000 angstroms.

In this embodiment, the opposite substrate 120 is a color filter substrate having a plurality of color filter films arranged in array, for example. In addition, the aforesaid color filter substrate may optionally include black matrix shielding areas between the color filter films. Furthermore, the material of the liquid crystal layer 130 is not limited in this embodiment.

The conductive sealant 140 includes an insulating adhesive 142 and a plurality of conductive particles 144 doped in the insulating adhesive 142. The conductive particles 144 are randomly distributed in the insulating adhesive 142, wherein the material of the insulating adhesive 142 is resin, and the conductive particles 144 are gold balls, for example. Since the conductive particles 144 are doped in the insulating adhesive 142 in advance, no dispensing of silver paste mentioned in the prior art is required after the conductive sealant 140 is dispensed. Accordingly, throughput of the LCD panel 100 can be increased.

As shown in FIG. 2, the restraining elements 150 of this embodiment is in contact with the dielectric layer 160 and the opposite substrate 120 so as to support between the dielectric layer 116 and the opposite substrate 120. In addition, the restraining elements 150 are in contact with the corners C of the conductive sealant 140 so as to limit a width of the corners C of the conductive sealant 140. In this embodiment, the restraining elements 150 and the spacers 124 on the opposite substrate 120 can be formed by the same process. The main function of the spacers 124 is keeping the cell gap between the active device array substrate 110 and the opposite substrate 120. For example, the material of the spacers is resin.

Figure 3A:
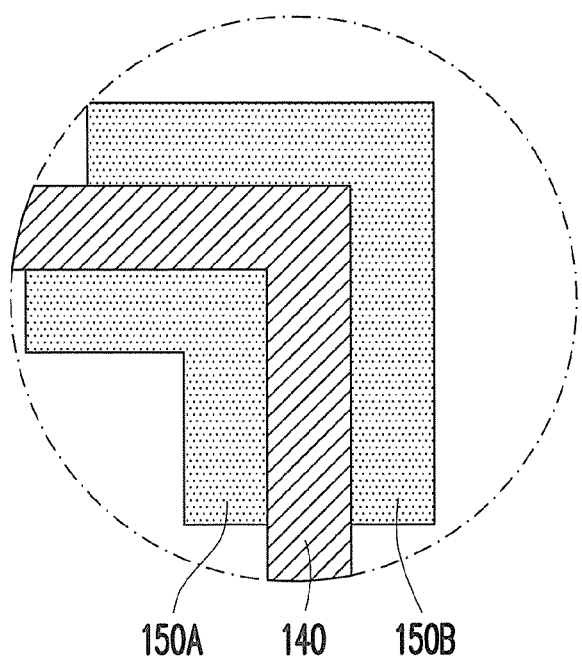
FIG. 3A and FIG. 3B are schematic top views illustrating the conductive sealant and the restraining elements according to an embodiment of the application.
Figure 3B:
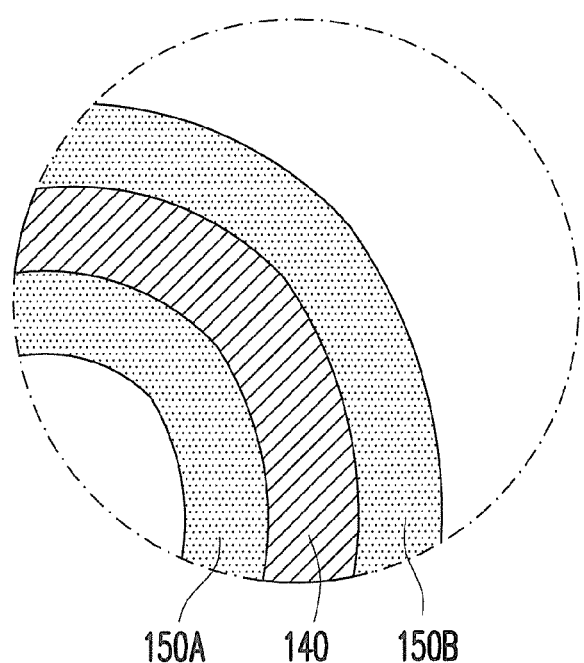

FIG. 3A and FIG. 3B are schematic top views illustrating the conductive sealant and the restraining elements according to an embodiment of the application. With reference to FIG. 3A and FIG. 3B, each of the restraining elements 150 is an L-shaped restraining element (as shown in FIG. 3A) or an arc-shaped restraining element (as shown in FIG. 3B). Specifically, the restraining elements 150 includes a plurality of inner restraining elements 150A and a plurality of outer restraining elements 150B, wherein the inner restraining elements 150A are distributed in an area surrounded by the conductive sealant 140, and the outer restraining elements 150B are distributed outside the area surrounded by the conductive sealant 140. As shown in FIG. 3A and FIG. 3B, each of the inner restraining elements 150A is an L-shaped inner restraining element or an arc-shaped inner restraining element. Each of the outer restraining elements 150B is an L-shaped outer restraining element or an arc-shaped outer restraining element. It is noted that, when each of the inner restraining elements 150A is an L-shaped inner restraining element, the outer restraining elements 150B can be an arc-shaped outer restraining element. Similarly, when each of the inner restraining elements 150A is an arc-shaped inner restraining element, the outer restraining elements 150B can be an L-shaped outer restraining element. Each of the above-mentioned restraining elements 150 bends or deflects toward the liquid crystal layer 130.

Figure 4:
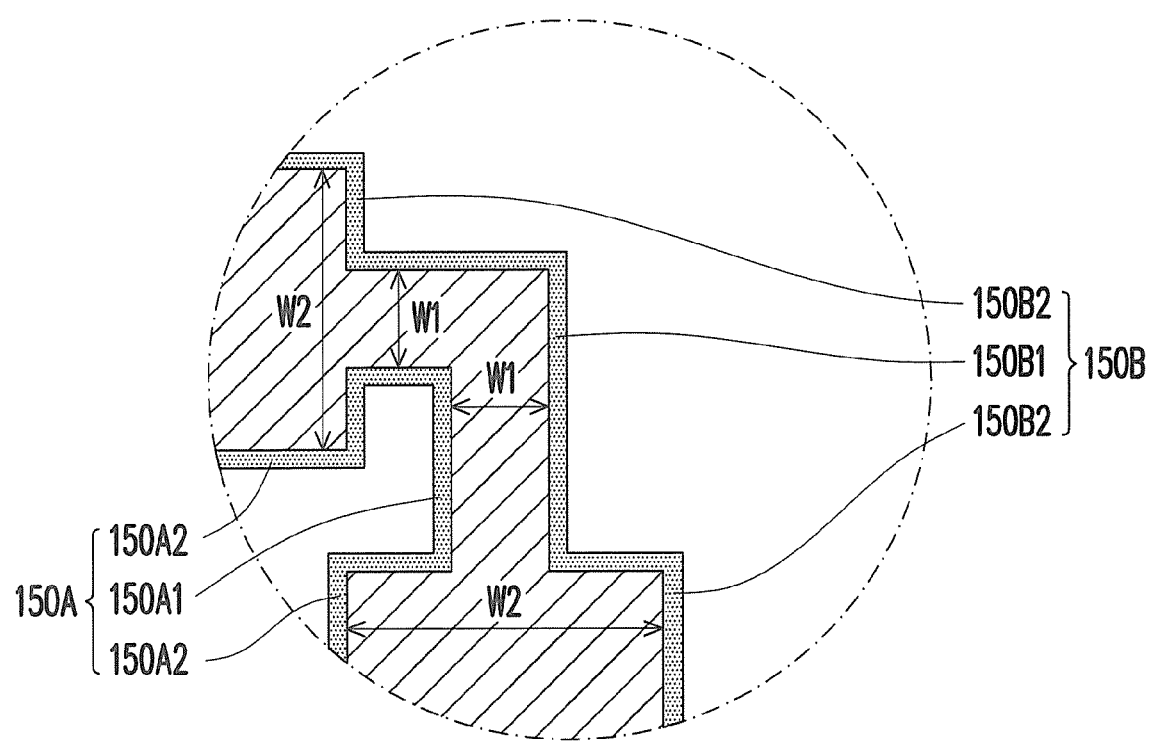
FIG. 4 is a schematic top view illustrating the conductive sealant and the restraining elements according to another embodiment of the application.

FIG. 4 is a schematic top view illustrating the conductive sealant and the restraining elements according to another embodiment of the application. With reference to FIG. 4, each of the inner restraining elements 150A includes a first deflection portion 150A1 and two first extending portions 150A2 connected to two ends of the first deflection portion 150A1, each of the outer restraining elements 150B includes a second deflection portion 150B1 and two second extending portions 150B2 connected to two ends of the second deflection portion 150B1. The conductive sealant 140 located between the first deflection portion 150A1 and the second deflection portion 150B1 has a first width W1, the conductive sealant 140 located between the first extending portion 150A2 and the second extending portion 150B2 has a second width W2. The second width W2 is greater than the first width W1.

Since conductive sealant 140 and restraining elements 150 are used in the LCD panel 100 of the present application, and the restraining elements 150 are disposed around each corner C of the conductive sealant 140, the conductive sealant 140 can be forced to fill into the openings 116a of the dielectric layer 116 during the bonding process of the active device array substrate 110 and the opposite substrate 120. Accordingly, the common lines 112 of the active device array substrate 110 are electrically connected to the common electrode 122 of the opposite substrate 120 more reliably. In addition, since the conductive sealant 140 is forced to fill into the openings 116a of the dielectric layer 116, the liquid crystal layer 130 does not overflow from the opening 116a of the dielectric layer 116.

Although the invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:

1. A liquid crystal display (LCD) panel, comprising:
    an active device array substrate, including:
        a plurality of common lines;
        a plurality of transfer pads; and
        a dielectric layer, wherein the transfer pads are electrically connected to the common lines, and the dielectric layer has a plurality of openings exposing the transfer pads;
    an opposite substrate having a common electrode;
    a liquid crystal layer disposed between the active device array substrate and the opposite substrate;
    a conductive sealant, disposed between the active device array substrate and the opposite substrate, the conductive sealant surrounding the liquid crystal layer, wherein the openings are corresponding to corners of the conductive sealant, the conductive sealant fills the openings, and the common electrode is electrically connected to the transfer pads through the conductive sealant; and
    a plurality of restraining elements, disposed between the active device array substrate and the opposite substrate, wherein the restraining elements are distributed around the corners of the conductive sealant such that the conductive sealant is forced to fill into the openings,.
    the restraining elements comprise:
        a plurality of inner restraining elements distributed in an area surrounded by the conductive sealant; and
        a plurality of outer restraining elements distributed outside the area surrounded by the conductive sealant, wherein each of the inner restraining elements includes a first deflection portion and two first extending portions connected to two ends of the first deflection portion, each of the outer restraining elements includes a second deflection portion and two second extending portions connected to two ends of the second deflection portion, the conductive sealant located between the first deflection portion and the second deflection portion has a first width, the conductive sealant located between the first extending portion and the second extending portion has a second width, and the second width is greater than the first width.

2. The LCD panel of claim 1, wherein a thickness of the dielectric layer ranges from about 42000 angstroms to about 43000 angstroms.

3. The LCD panel of claim 1, wherein the restraining elements is in contact with the dielectric layer and the opposite substrate to support between the dielectric layer and the opposite substrate.

4. The LCD panel of claim 1, wherein the restraining elements are in contact with the corners of the conductive sealant to limit a width of the corners of the conductive sealant.

5. The LCD panel of claim 1, wherein each of the restraining elements is an L-shaped restraining element or an arc-shaped restraining element.

6. The LCD panel of claim 1, wherein each of the inner restraining elements is an L-shaped inner restraining element or an arc-shaped inner restraining element, and each of the outer restraining elements is an L-shaped outer restraining element or an arc-shaped outer restraining element.

* * * * *